United States Patent [19]
Kvant et al.

[11] Patent Number: 5,182,094
[45] Date of Patent: Jan. 26, 1993

[54] PROCESS FOR THE PREPARATION OF POLYALUMINUM COMPOUNDS

[75] Inventors: Magnus Kvant, Niederroedern, France; Kjell Stendahl, Helsingborg, Sweden

[73] Assignee: Kemira Kemi Aktiebolag, Helsingborg, Sweden

[21] Appl. No.: 479,256

[22] Filed: Feb. 13, 1990

[30] Foreign Application Priority Data

Feb. 13, 1989 [SE] Sweden .............................. 8900478-2

[51] Int. Cl.$^5$ .............................................. C01F 7/56
[52] U.S. Cl. .................................................. 423/462
[58] Field of Search .......................................... 423/462

[56] References Cited

U.S. PATENT DOCUMENTS

| | | | |
|---|---|---|---|
| 3,909,439 | 9/1975 | Rivola et al. | 423/462 |
| 3,953,584 | 4/1976 | Danner et al. | 423/462 |
| 4,082,685 | 4/1978 | Notari et al. | 423/462 |
| 4,390,445 | 6/1983 | Gytel | 423/462 |
| 4,859,446 | 8/1989 | Abrutyn et al. | 423/462 |

OTHER PUBLICATIONS

Perry and Chilton "Chemical Engineers Handbook" 5th edition, p. 4-3.

Primary Examiner—John Niebling
Assistant Examiner—Brian M. Bolam
Attorney, Agent, or Firm—Burns, Doane, Swecker & Mathis

[57] ABSTRACT

The present invention relates to a process for the preparation of polyaluminum hydroxychloride complexes having the general formula $Al(OH)_xCl_y$ in solution or in solid form and intended to be used as flocculants and coagulants for water purification, sludge dewatering, plant dewatering and paper production, whereby one reacts aluminum chloride in solution with aluminum hydroxide, or aluminumoxide hydrates at a temperature of 120°–170° C. at an elevated pressure for 1.5–5 hrs, whereby the relationship $AlCl_3:Al(OH)_3$ is thus adjusted that the relationship OH:Al in the renewing compound $Al(OH)_xCl_y$ becomes 0.5 to 1.5, preferably 0.8 to 1.2.

10 Claims, No Drawings

PROCESS FOR THE PREPARATION OF POLYALUMINUM COMPOUNDS

DESCRIPTION

1. Technical Field

The present invention relates to a process for the preparation of polyaluminium hydroxychloride complexes intended for water purification, sludge dewatering, paper production, plant dewatering and similar uses, in solution or solid form.

One object of the present invention is to obtain a simplified process for the preparation of polyaluminium hydroxychloride complexes, so called PAC, using more simple raw materials, lower transportation costs and more simple production equipment.

2. Background of the invention

It is previously known to prepare polyaluminium hydroxychloride complexes by reacting aluminum oxide or aluminium hydrates with hydrochloric acid, whereby the reaction is carried out using a large stoichiometric excess of aluminium oxide at an elevated pressure and temperature (SE-C-7302924-1). A consequence of this process is that large amounts of non-reacted aluminium hydroxide material has to be returned to the process after a complicated separation and isolation process, which makes the process considerably more expensive. This process is further limited with regard to the starting materials. Thus the patent specification discloses that bauxite can not be used, which means that a relatively cheap and good source of raw material stands outside the possibilities of improving this process. This drawback has also been confirmed in our own experiments, whereby it became evident that when using bauxite in excess a slimy, residual product was obtained which was hard to handle.

Using hydrochloric acid means an environmental problem of several kinds. Hydrochloric acid has to be transported and suitable ventilation has to be arranged in order to eliminate hydrogen chloride gas. Working at high pressures and/or high temperatures thereby always provide complications leading to great increases in the cost of the final product.

It is also known to produce solutions of polyaluminium hydroxychloride complexes, whereby one reacts a hydrogen carbonate or a carbonate of an alkali metal or alkaline earth metal with aluminium chloride in an aqueous solution. This process leads, however, only to solutions and it is difficult to obtain dry products therefrom. Further, the process means that carbon dioxide leaves the reaction which may provide frothing problems, and primarily it means that good ventilation has to be provided. (SE-C-8101829-3).

Thus there has been brought forward a demand for a simplified process where one eliminates the above mentioned problems and difficulties.

DESCRIPTION OF THE PREFERRED EMBODIMENTS

It has surprisingly been shown possible by means of the present invention to be able to obtain the above mentioned polyaluminium hydroxychloride complexes, whereby the invention is characterized in that one reacts aluminium chloride in solution with aluminium hydroxide, or aluminiumoxide hydrates at a temperature of 120°–170° C. and an elevated pressure for 1.5 to 5 hrs, whereby the relation $AlCl_3:Al(OH)_3$ is thus adjusted that the relationship OH:Al in the resulting compound $Al(OH)_xCl_y$ becomes 0.5 to 1.5, preferably 0.8 to 1.2, whereby the aluminium chloride present may be prepared in situ by reacting hydrochloric acid and the aluminium raw material present in a stoichiometric relationship.

The aluminium raw material present can be hydrated aluminiumoxide, aluminium hydroxide, bauxite, kaolin, Bayer-aluminiumhydroxide.

It shall be understood that when the starting material contains iron a small amount of the aluminium amount will be replaced by ferric ions; however, not in a stoichiometric relation to that present in the raw material. Only a part of the iron compounds will thus dissolve and the remaining amount will be obtained as a solid precipitate which can be separated off.

The present process is, from a practical point of view, carried out at a temperature of 120°–170° C. having the aluminium chloride present in an aqueous solution, whereby the reaction with aluminiumhydroxide/oxide preferably is carried out in a pressure reactor. The pressure in the reactor can thereby be 1 to 7 atm (i.e. atmospheres absolute pressure).

Normally, a ready-to-use solution is prepared having an Al-content of 5–10%. In certain cases a solid product can be obtained by drying a solution containing 16–17% of Al, whereby spray drying or roller drying can be used as the drying method.

The starting Al-chloride solution, which has an Al-content of 3 to 8% Al is provided with aluminium hydroxide raw material, which may contain up to 35% of Al, in such a stoichiometric amount that the OH:Al relationship becomes 0.5–1.5, preferably 0.8–1.2. There is no need to use an excess of aluminium hydroxide since the reaction continues to completion. In those cases a higher molar relationship than 1.2 is wanted from a process technical point of view considering the use thereof, such as for water purification, this molar relationship can easily be increased by adding CaO, or $CaCO_3$ or $Ca(OH)_2$, whereby a molar relationship of 1.8–1.9 without increasing the reaction time to any considerable extent. In the case one wants a further increase in the molar relationship OH:Al up to 2.5, metallic aluminium is added in a stoichiometric amount. At increased molar ratios above 1.2 one should note that the final product does not contain too a high concentration of polyaluminium hydroxychloride product as it may then turn into a gel form. A suitable concentration is then 5–6% of Al.

The invention will be described in the following more in detail with reference to the examples given, however, without being restricted hereto.

The examples are preferred embodiments of the invention.

EXAMPLE 1

300 g of an aqueous solution of aluminium chloride having an aluminium content of 9.2% were mixed with 53 g of anhydrous aluminiumhydrate $(Al(OH)_3)$ of standard quality in an autoclave provided with a stirrer. The temperature was raised to 150° C. by heating the jacket. After 5 hrs the temperature was lowered and from the final ready-to-use solution obtained a sample was taken out for analysis.

The aluminium hydroxide thereby turned out to be completely dissolved in the solution of aluminium chloride and had reacted to the formation of a substantially clear solution having an aluminium content of 12.9%.

The theoretical value calculated on the ingoing components was 13.0%. Yield: 98%. The product formed had the composition $Al(OH)_{1.2}Cl_{1.8}$.

EXAMPLE 2

To an autoclave provided with a stirrer 350 g of aluminium chloride in an aqueous solution having an aluminium content of 5.3% by weight and 35 g of finely ground bauxite (80% of the bauxite powder passed through a 50 micron sieve) of South American origin were added. The bauxite contained 28.6% of Al and 3.2% of $SiO_2$. The temperature of the reactor was raised to 155° C. by heating the jacket. After 5 hrs the reactor temperature was lowered to room temperature. The slurry was centrifuged for 30 min at about 2500 G to eliminate solid silicon compounds. The supernatant was analysed. It contained thereby 7.1% of Al and 19.1% of Cl.

EXAMPLE 3

350 g of an aluminium chloride aqueous solution having an aluminium content of 5.4% by weight were mixed with 36.46 g of aluminium hydrate $(Al(OH)_3)$ of standard quality in an autoclave provided with stirrer. The temperature was raised to 150° C. by heating the jacket. After 5 hrs the temperature was lowered to room temperature and the solution was analysed. Thereby it turned out that the aluminiumhydrate had dissolved in the aluminium chloride solution and had reacted with it to the formation of a clear solution having an aluminium content of 8.1% and a chloride content of 19.3%. The product formed had the composition $Al(OH)_{1.2}Cl_{1.8}$.

The aluminium hydroxychloride complex solutions are excellent flocculating agents for water purification and other reactions where aluminium compounds are used for the formation of flocs, such as sludge dewatering, plant dewatering, paper production and the like.

We claim:

1. A process for preparing polyaluminum hydroxy chloride complexes having the general formula $Al(OH)_xCl_y$ in solution or solid form comprising reacting aluminum chloride in solution having an aluminum content of 5 to 12% with aluminum hydroxide or aluminum hydroxide hydrates in a stoichiometric ratio so that the process is conducted in the absence of an excess of aluminum hydroxide at a temperature of 120°–170° C. at an elevated pressure up to 7 atmospheres for 1.5–5 hours whereby the ratio $AlCl_3:(OH)_3$ is adjusted so that the ratio OH:Al in the resulting compound $Al(OH)_xCl_y$ is 0.5–2.5 and the aluminum content is 5 to 9.5%.

2. The process of claim 1 wherein the OH:Al ratio is 0.5–1.5.

3. The process of claim 2 wherein the aluminum chloride is produced in situ by first reacting hydrochloric acid and aluminum hydroxide raw material in stoichiometric amounts.

4. The process of claim 2 wherein the aluminum hydroxide raw material is selected from aluminum hydroxide, aluminum oxide hydrates, Bayer-hydroxide, kaolin and/or bauxite.

5. The process of claim 1 wherein the resulting polyaluminum hydroxychloride complex is spray dried in an aluminum content of 16 to 17% by weight.

6. The process of claim 1 wherein the molar ratio of OH:Al of the resulting polyaluminum hydroxychloride complex is adjusted to 1.9 by adding at least one of $Ca(OH)_2$, CaO and $CaCO_3$.

7. The process of claim 1 wherein the molar ratio of OH:Al of the resulting polyaluminum hydroxychloride complex is subsequently increased to up to 2.5 by adding metallic aluminum.

8. The process of claim 1 wherein the molar ratio of OH:Al is 0.8–1.2.

9. The process of claim 3 wherein the aluminum hydroxide raw material is selected from aluminum hydroxide, aluminum oxide hydrates, Bayer-hydroxide, kaolin and/or bauxite.

10. The process of claim 1 wherein the resulting polyaluminum hydroxychloride complex is spray dried to an aluminum content of 16 to 17% by weight.

* * * * *

UNITED STATES PATENT AND TRADEMARK OFFICE
CERTIFICATE OF CORRECTION

PATENT NO. : 5,182,094

DATED : January 26, 1993

INVENTOR(S) : Kvant et al.

It is certified that error appears in the above-identified patent and that said Letters Patent is hereby corrected as shown below:

In column 4, line 8, amend "$AlCl_3:(OH)_3$" to --$AlCl_3:Al(OH)_3$--.

Signed and Sealed this

First Day of February, 1994

Attest:

BRUCE LEHMAN

*Attesting Officer*     *Commissioner of Patents and Trademarks*